United States Patent
Fairfield et al.

(10) Patent No.: US 9,547,989 B2
(45) Date of Patent: Jan. 17, 2017

(54) REPORTING ROAD EVENT DATA AND SHARING WITH OTHER VEHICLES

(71) Applicant: Google Inc., Mountain View, CA (US)

(72) Inventors: Nathaniel Fairfield, Mountain View, CA (US); Joshua Seth Herbach, Mountain View, CA (US); Andrew Hughes Chatham, Mountain View, CA (US); Michael Steven Montemerlo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/196,961

(22) Filed: Mar. 4, 2014

(65) Prior Publication Data

US 2015/0254986 A1    Sep. 10, 2015

(51) Int. Cl.
*G06F 17/30* (2006.01)
*G08G 1/00* (2006.01)
(Continued)

(52) U.S. Cl.
CPC .............. *G08G 1/22* (2013.01); *B60W 30/00* (2013.01); *G08G 1/161* (2013.01)

(58) Field of Classification Search
None
See application file for complete search history.

(56) References Cited

U.S. PATENT DOCUMENTS 6,876,907 B2    4/2005    Kanner et al.
8,063,793 B2    11/2011    Shrum
(Continued)

FOREIGN PATENT DOCUMENTS

JP    09-244745    9/1997
JP    2000-321081    11/2000
(Continued)

OTHER PUBLICATIONS

International Searching Authority, International Search Report and Written Opinion for PCT/US2015/015039 mailed May 19, 2015, 10 pages.

(Continued)

*Primary Examiner* — Wilson Lee
(74) *Attorney, Agent, or Firm* — McDonnell Boehnen Hulbert & Berghoff LLP

(57) ABSTRACT

Example systems and methods allow for reporting and sharing of information reports relating to driving conditions within a fleet of autonomous vehicles. One example method includes receiving information reports relating to driving conditions from a plurality of autonomous vehicles within a fleet of autonomous vehicles. The method may also include receiving sensor data from a plurality of autonomous vehicles within the fleet of autonomous vehicles. The method may further include validating some of the information reports based at least in part on the sensor data. The method may additionally include combining validated information reports into a driving information map. The method may also include periodically filtering the driving information map to remove outdated information reports. The method may further include providing portions of the driving information map to autonomous vehicles within the fleet of autonomous vehicles.

14 Claims, 11 Drawing Sheets

(51) Int. Cl.
*B60W 30/00* (2006.01)
*G08G 1/16* (2006.01)

(56) References Cited

U.S. PATENT DOCUMENTS

| | | | |
|---|---|---|---|
| 8,126,642 B2 | 2/2012 | Trepagnier | |
| 8,437,890 B2 | 5/2013 | Anderson et al. | |
| 8,467,928 B2 | 6/2013 | Anderson | |
| 8,473,140 B2 | 6/2013 | Norris et al. | |
| 8,527,199 B1 | 9/2013 | Burnette et al. | |
| 8,532,862 B2 | 9/2013 | Neff | |
| 8,577,517 B2 | 11/2013 | Phillips | |
| 8,639,408 B2 | 1/2014 | Anderson | |
| 8,718,910 B2* | 5/2014 | Gueziec | G08G 1/0112 701/119 |
| 2006/0089800 A1 | 4/2006 | Svendsen et al. | |
| 2007/0021915 A1* | 1/2007 | Breed | B60N 2/2863 701/301 |
| 2007/0198144 A1* | 8/2007 | Norris | H04L 67/12 701/23 |
| 2007/0233338 A1 | 10/2007 | Ariyur et al. | |
| 2008/0262721 A1* | 10/2008 | Guo | G01C 21/32 701/532 |
| 2009/0257620 A1* | 10/2009 | Hicks | G06Q 30/02 382/100 |
| 2010/0061591 A1 | 3/2010 | Okada et al. | |
| 2011/0144828 A1 | 6/2011 | Chengalva | |
| 2011/0244798 A1* | 10/2011 | Daigle | H04L 63/08 455/41.2 |
| 2011/0288695 A1 | 11/2011 | Gariepy et al. | |
| 2011/0320492 A1* | 12/2011 | Inghelbrecht | G06Q 50/30 707/776 |
| 2012/0095619 A1 | 4/2012 | Pack et al. | |
| 2012/0310465 A1 | 12/2012 | Boatright et al. | |
| 2012/0316780 A1* | 12/2012 | Huth | G01C 21/36 701/450 |
| 2013/0150004 A1* | 6/2013 | Rosen | H04W 8/22 455/414.1 |
| 2013/0253765 A1 | 9/2013 | Bolourchi et al. | |
| 2015/0032366 A1* | 1/2015 | Man | G08G 1/095 701/412 |
| 2015/0100567 A1* | 4/2015 | Weir | G06F 17/30424 707/722 |
| 2015/0211879 A1* | 7/2015 | Nomura | G08G 1/161 701/523 |
| 2015/0291093 A1* | 10/2015 | Iwai | G08G 1/166 340/995.27 |
| 2015/0294431 A1* | 10/2015 | Fiorucci | G06Q 50/26 705/13 |

FOREIGN PATENT DOCUMENTS

| | | |
|---|---|---|
| WO | 2009140514 | 11/2009 |
| WO | 2011104369 | 9/2011 |
| WO | 2011/154680 | 12/2011 |

OTHER PUBLICATIONS

International Searching Authority, International Search Report and Written Opinion for PCT/US2015/015040 mailed May 15, 2015, 14 pages.

* cited by examiner

REPORTING ROAD EVENT DATA AND SHARING WITH OTHER VEHICLES

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that allow for reporting and sharing of information reports relating to driving conditions within a fleet of autonomous vehicles. During the operation of autonomous vehicles, the vehicles may identify potential conflicts or obstacles within the environment. Information reports from the vehicles may be received identifying potential issues, the reports may be validated, and then the reports may be combined into a driving information map. Portions of the driving information map may then be provided to vehicles within the fleet.

In one example, a method is provided that includes receiving information reports relating to driving conditions from a plurality of autonomous vehicles within a fleet of autonomous vehicles. The method may also include receiving sensor data from a plurality of autonomous vehicles within the fleet of autonomous vehicles. The method may further include validating some of the information reports based at least in part on the sensor data. The method may additionally include combining validated information reports into a driving information map. The method may also include periodically filtering the driving information map to remove outdated information reports. The method may further include providing portions of the driving information map to autonomous vehicles within the fleet of autonomous vehicles.

In a further example, a system including a control system is disclosed. The control system may be configured to receive information reports relating to driving conditions from a plurality of autonomous vehicles within the fleet of autonomous vehicles. The control system may also be configured to receive sensor data from a plurality of autonomous vehicles within the fleet of autonomous vehicles. The control system may further be configured to validate some of the information reports based at least in part on the sensor data. The control system may additionally be configured to combine validated information reports into a driving information map. The control system may also be configured to periodically filter the driving information map to remove outdated information reports. The control system may further be configured to provide portions of the driving information map to autonomous vehicles within the fleet of autonomous vehicles.

In another example, a non-transitory computer readable medium having stored therein instructions, that when executed by a computing system, cause the computing system to perform functions is disclosed. The functions may include receiving information reports relating to driving conditions from a plurality of autonomous vehicles within a fleet of autonomous vehicles. The functions may also include receiving sensor data from a plurality of autonomous vehicles within the fleet of autonomous vehicles. The functions may further include validating some of the information reports based at least in part on the sensor data. The functions may additionally include combining validated information reports into a driving information map. The functions may further include periodically filtering the driving information map to remove outdated information reports. The functions may also include providing portions of the driving information map to autonomous vehicles within the fleet of autonomous vehicles.

In yet another example, a system may include means for receiving information reports relating to driving conditions from a plurality of autonomous vehicles within a fleet of autonomous vehicles. The system may also include means for receiving sensor data from a plurality of autonomous vehicles within the fleet of autonomous vehicles. The system may further include means for validating some of the information reports based at least in part on the sensor data. The system may additionally include means for combining validated information reports into a driving information map. The system may also include means for periodically filtering the driving information map to remove outdated information reports. The system may further include means for providing portions of the driving information map to autonomous vehicles within the fleet of autonomous vehicles.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
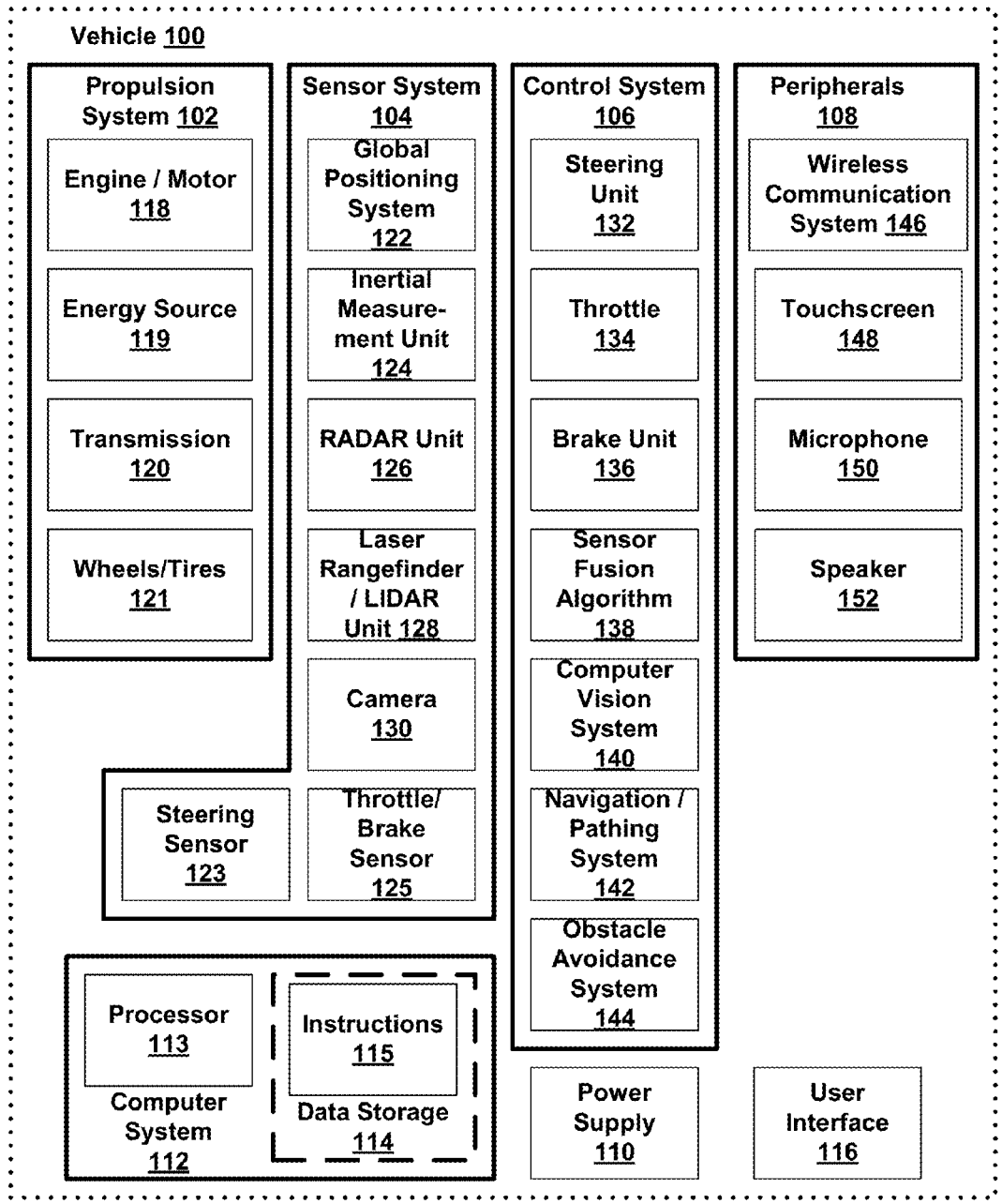
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

A vehicle may be configured to operate in an autonomous mode in which the vehicle may use a computer system to control the operation of the vehicle with little or no human input. For example, a human operator may enter a destination address into an autonomous vehicle and the vehicle may then be able to drive, without further input from the human (e.g., the human does not have to steer or touch the brake/gas pedals), to the specified destination.

To assist operation of a fleet of autonomous vehicles, a fleet control system may compile information about the current state of various driving conditions within the world (e.g., road blockages, construction, traffic, etc.). The control system may maintain a persistent, time-ordered database of information by combining information reports from individual vehicles. The vehicles may be autonomously detecting possible issues within the environment and generating reports to send back to the fleet control system. The vehicles also may send sensor data collected from the environment along with the reports.

Within examples, the control system may validate incoming reports using the sensor data. The control system also may periodically update the information by removing outdated information reports as new information becomes available. Additionally, the control system may deploy information back out to vehicles within the fleet to use in operation. In some examples, the database may be optimized to compact the information (e.g., by removing duplicate reports). In further examples, the database may be refined based on new information reports using one of a number of different possible algorithms or statistical methods (such as Bayesian inference) to combine observations from multiple cars and update stored information.

In some examples, the control system may associate a confidence level with individual information reports. In further examples, the system may require a certain level of confidence in a particular information report before validating the report and adding it to the database. Some information reports with high confidence levels may automatically be validated. In some examples, a higher level of confidence may be required for more important information (e.g., reports in higher traffic areas or reports about more severe obstructions). In another example, a certain number of similar reports may be required before a particular report is trusted.

In further examples, various methods of validation may be used to validate information reports, depending on the confidence level associated with a particular report. In some examples, this validation may be performed by a human operator. For instance, a human operator may be presented with a user interface including the information reported as well as collected sensor data from the autonomous vehicle. The human operator may be able to validate a report by entering an input via the user interface. In other examples, more powerful remote computing systems may be used to validate some information reports. In some examples, these methods of validation may only be used for certain pieces of information (e.g., when the information is particularly important and/or confidence in the information is low). In further examples, the control system may also be able to deploy vehicles to a particular area to validate a reported issue.

In additional examples, the database may also contain proposed courses of action for vehicles to take in dealing with identified road events. In further examples, these proposed courses of action may have been determined to work by other vehicles and/or by human operators. For instance, a human operator may validate a report and provide instructions for a particular autonomous vehicle. The instructions may then be provided to other autonomous vehicles encountering the same situation at the same location. Other information may be stored and/or transmitted using the database of reports in some examples as well.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
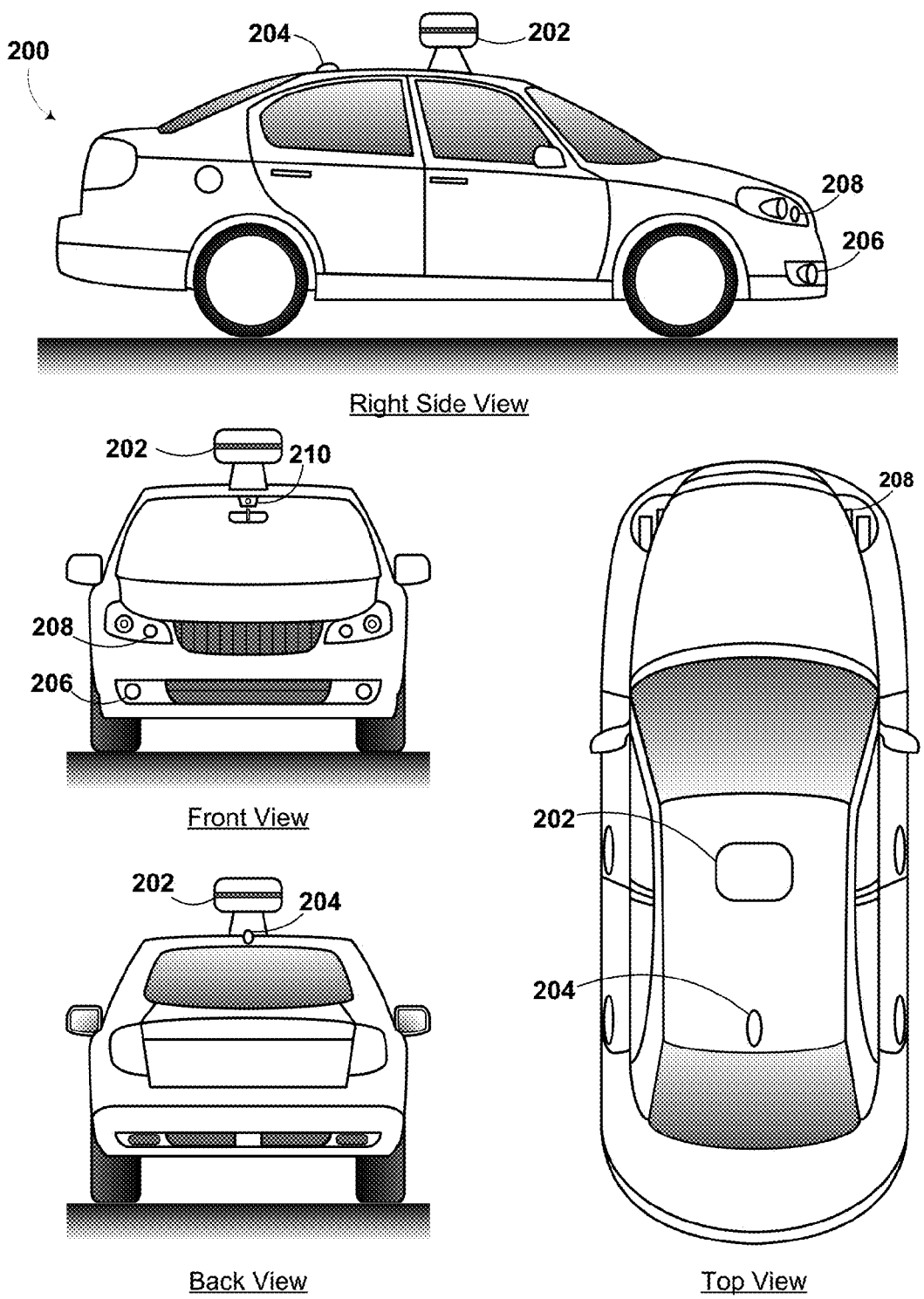
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

A method 300 is provided for receiving and combining information reports relating to driving conditions from vehicles within a fleet of autonomous vehicles. In some examples, method 300 may be carried out by an assistance center, which may contain a control system in communication with vehicles within the fleet. For instance, the assistance center may communicate with individual vehicles using a wireless network connection. In other examples, part or all of method 300 may be carried out by one or more vehicles within a fleet of autonomous vehicles, such as vehicle 100 and/or vehicle 200 as illustrated and described in reference to FIGS. 1 and 2, respectively. For example, the processes described herein may be carried out using a RADAR unit 126, a laser rangefinder and/or LIDAR unit 128, and/or a camera 130 mounted to an autonomous vehicle in communication with a control system 106, a sensor fusion algorithm 138, a computer vision system 140, a navigation system 142, and/or an obstacle avoidance system 144. Additionally, method 300 may be carried out using sensor data from one or more sensors on an autonomous vehicle (e.g., vehicle 200) such as sensor unit 202 and/or camera 210 as shown in FIG. 2.

Furthermore, it is noted that the functionality described in connection with the flowcharts described herein can be implemented as special-function and/or configured general-function hardware modules, portions of program code executed by a processor (e.g., the processor 113 within computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as data storage 114 described above with respect to computer system 112 and/or a computer program product 600 described below), for example, such as a storage device including a disk or hard drive.

Figure 3:
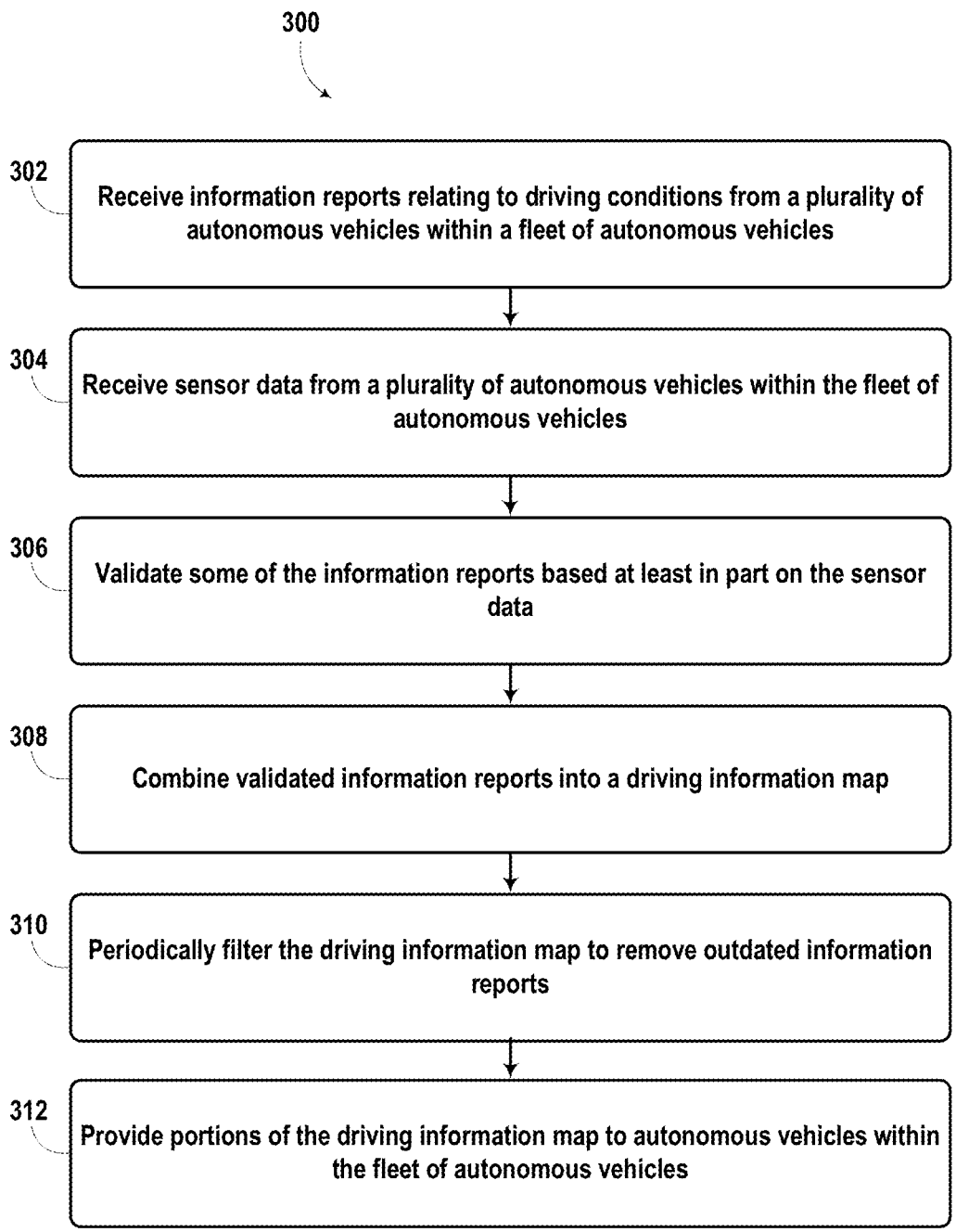
FIG. 3 is a block diagram of a method, according to an example embodiment.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may initially involve receiving information reports relating to driving conditions from vehicles within a fleet of autonomous vehicles. The vehicles may be programmed to autonomously generate reports to send back to a control center that receives and compiles the reports. Within examples, the reports may relate to any conditions or aspects of the environment that may be relevant for operating vehicles within the environment, including traffic conditions, weather conditions, road blockages, areas of construction, unexpected rerouting or road changes, or unexpected signage. In some examples, the vehicles may autonomously collect sensor data from the surrounding environment and generate information reports, possibly including information reports that don't affect the vehicle's own travel (e.g., detecting and identifying a potential blockage on a nearby road that the vehicle is not traveling on).

Figure 4A:
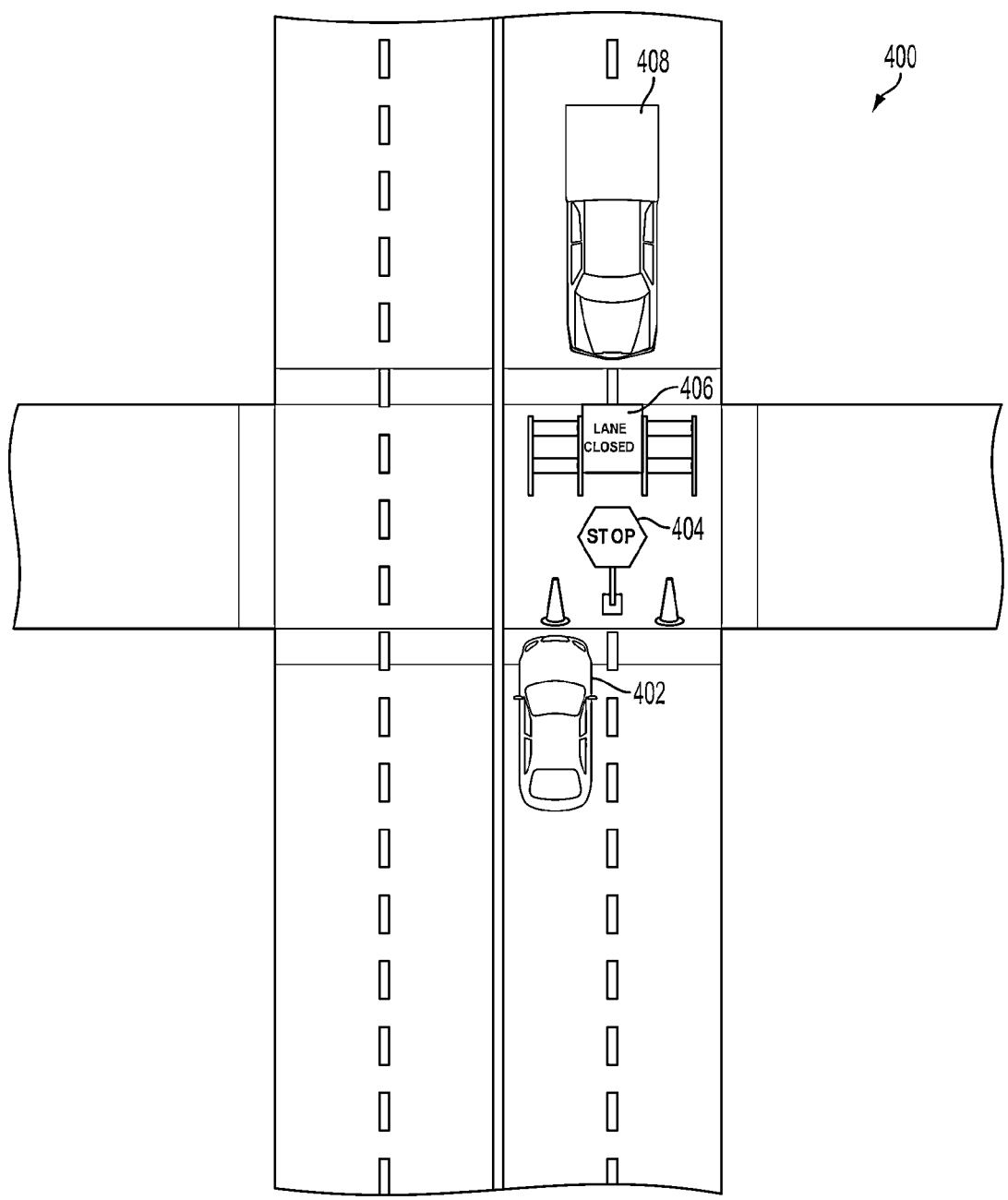
FIG. 4A illustrates a top view of an autonomous vehicle operating scenario, according to an example embodiment.

FIG. 4A illustrates a top view of a scenario encountered by an autonomous vehicle, in accordance with an example embodiment. As shown, an autonomous vehicle 402 may be operating within an environment 400 when the vehicle detects a temporary stop sign 404 that was not present in the vehicle's prior map of the environment 400. Processing systems within the autonomous vehicle 402 may identify this scenario (e.g., detection of a temporary stop sign) as a scenario that prompts the generation of an information report to inform other vehicles of the situation. Accordingly, an information report indicating the location of the temporary stop sign 404 may be received from vehicle 402.

Figure 4B:
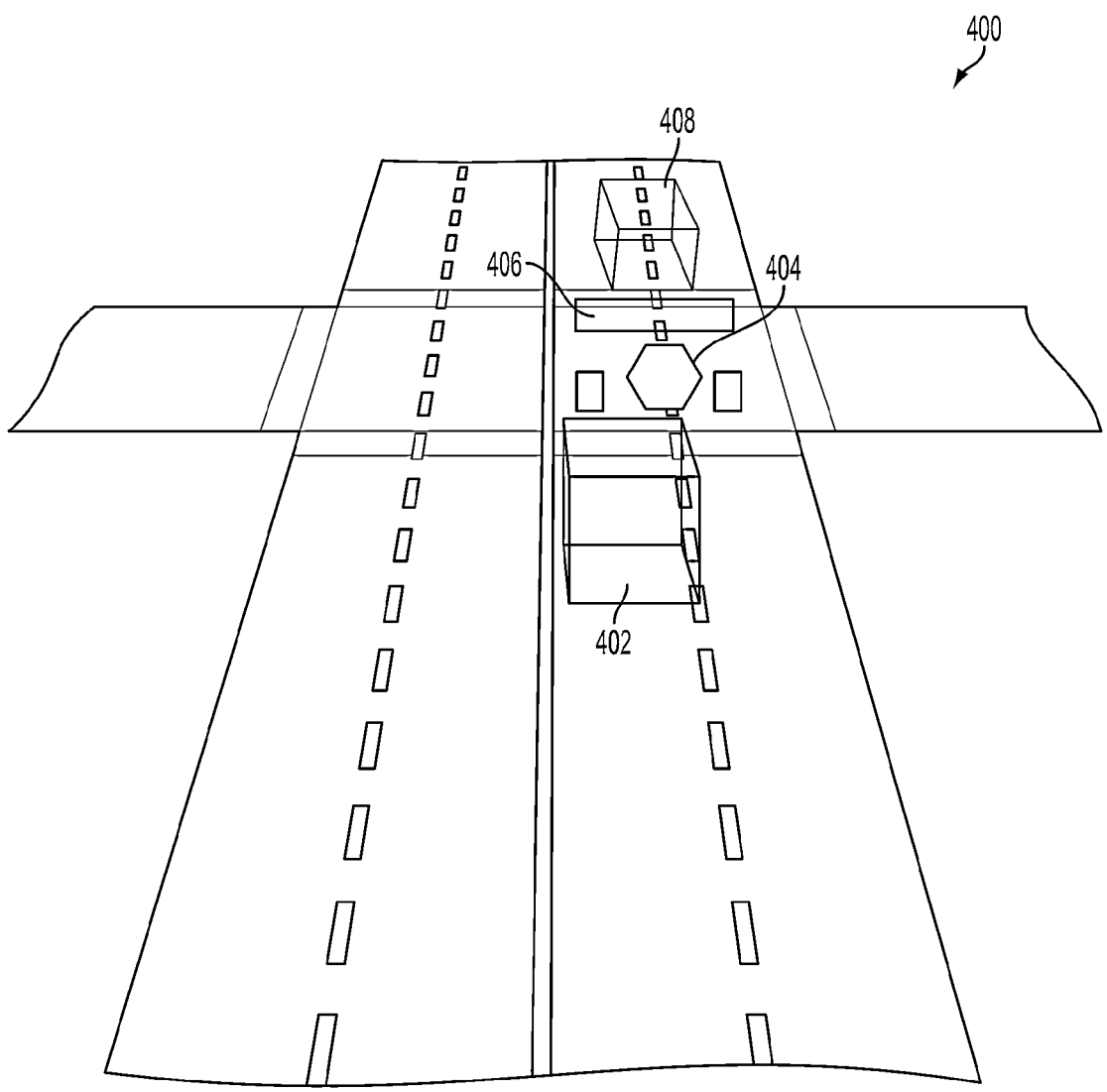
FIG. 4B illustrates a sensor representation of the scenario from FIG. 4A, according to an example embodiment.

As shown by block 304 of FIG. 3, method 300 may additionally involve receiving sensor data from vehicles operating within the fleet. For instance, the sensor data may be received by a control center which also receives the information reports, either simultaneously or at different times and/or from different vehicles. In order to navigate through an environment (and possibly generate information reports), an autonomous vehicle may determine a representation of the environment based on sensor data. FIG. 4B illustrates a representation of the environment from FIG. 4A based on sensor data collected by the vehicle, according to an example embodiment. An autonomous vehicle may receive data collected from the environment in which the vehicle operates in a variety of ways. In particular the vehicle may be equipped with one or more sensor systems that provide data describing the surrounding environment. For example, a vehicle may have various sensors, including a camera, a radar unit, a laser range finder, a microphone, a radio unit, and other sensors. Each of these sensors may communicate data to a processor in the vehicle about information each respective sensor receives.

In one example, a camera may be configured to capture still images and/or video. In various embodiments, the vehicle may have more than one camera positioned in different orientations. Also, in some embodiments the camera may be able to move to capture images and/or video in different directions. The camera may be configured to store captured images and video to a memory for later processing by a processing system of the vehicle. The captured images and/or video may form a portion of the sensor data received from autonomous vehicles within the fleet.

In another example, a radar unit may be configured to transmit an electromagnetic signal that will be reflected by various objects near the vehicle. The radar unit may be able to capture reflected electromagnetic signals. The captured reflected electromagnetic signals may enable the radar system (or processing system) to make various determinations about objects that reflected the electromagnetic signal. For example, the distance and position to various reflecting objects may be determined. In various embodiments, the vehicle may have more than one radar unit in different orientations. The radar system may be configured to store captured information to a memory for later processing by a processing system of the vehicle. The information captured by the radar system may form a portion of the sensor data received from autonomous vehicles within the fleet.

In further examples, a laser range-finding system may be configured to transmit an electromagnetic signal (e.g., light, such as that from a gas or diode laser, or other possible light source) that will be reflected by target objects near the vehicle. The laser range-finding system may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as data collected from an environment, which may then be sent to a control center.

Additionally, in other examples, a microphone may be configured to capture audio data from the environment surrounding the vehicle. Sounds captured by the microphone may include sounds from vehicles or other aspects of the environment. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the sensor data received from autonomous vehicles within the fleet.

In additional examples, the radio unit may be configured to transmit an electromagnetic signal that may take the form of a Bluetooth signal, 802.11 signal, and/or other radio technology signal. The electromagnetic radiation signal may be transmitted via one or more antennas located in a radio unit. Further, the electromagnetic radiation signal may be transmitted with one of many different radio-signaling modes. In some embodiments, it may be desirable to transmit the electromagnetic radiation signal with a signaling mode that requests a response from devices located near the autonomous vehicle. The processing system may be able to detect nearby devices based on the responses communicated back to the radio unit and use this communicated information as a portion of the sensor data sent to the control center.

In some embodiments, the processing system may be able to combine information from some or all of the vehicle's sensors in order to make further determinations about the environment of the vehicle. For example, the processing system may combine both radar information and a captured image to determine if another vehicle or pedestrian is in front of the autonomous vehicle. In other embodiments, other combinations of sensor data may be used by the processing system to make determinations about the environment as well.

While the vehicle is operating autonomously, the processing system of the vehicle may alter the control of the vehicle based on data received from the various sensors. In some examples, the autonomous vehicle may alter a velocity of the autonomous vehicle in response to data from the various sensors. For instance, the autonomous vehicle may change velocity in order to avoid obstacles, obey traffic laws, etc. When a processing system in the vehicle identifies obstacles or other situations encountered by the autonomous vehicle, the vehicle may be able to autonomously determine how to proceed (e.g., by altering velocity, changing trajectory to avoid an obstacle, and so on).

As shown in FIG. 4B, the autonomous vehicle 402 may create a representation of its environment 400 based on any combination of possible types of sensor data as described above. In some examples, the representation may not be a perfect copy of the environment. For instance, some of the sensors may be blocked in certain directions or some of the sensor data may be distorted. Additionally, the autonomous vehicle 402 may not be able to identify some objects or other aspects of the environment. For instance, the autonomous vehicle 402 may identify the temporary stop sign 404 as well as another sign 406 and a construction vehicle 408 in the lane of travel beyond the signs. The autonomous vehicle 402 may generate an information report based on its detection of the temporary stop sign 404. However, the autonomous vehicle 402 may not be able to identify the cause of the blockage and/or how best to proceed within the particular situation depicted. In such circumstances, the autonomous vehicle 402 may additionally transmit sensor data from its environment along with the information report to a control center for processing.

Figure 4C:
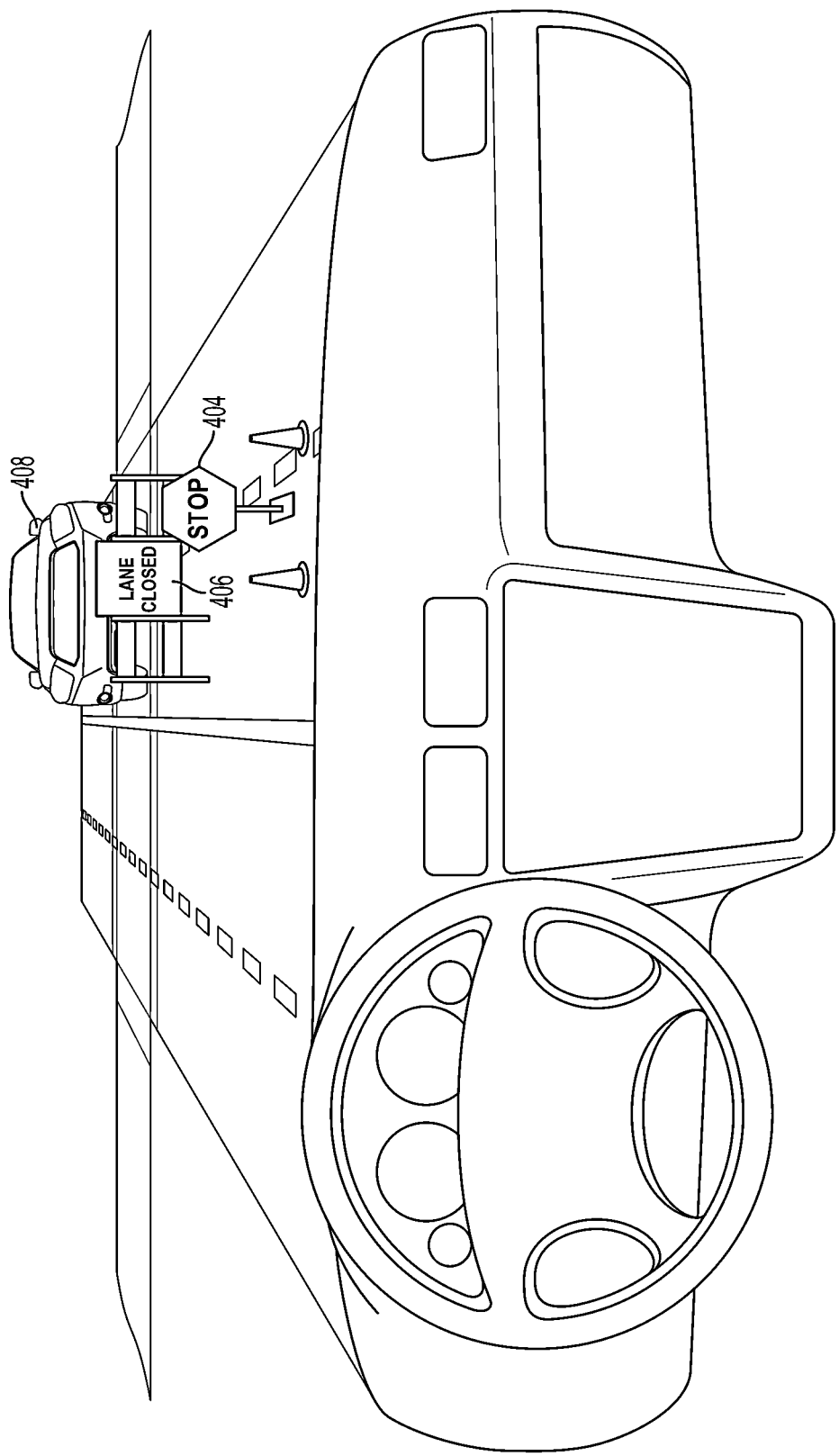
FIG. 4C illustrates a video feed taken from the vehicle in FIG. 4A, according to an example embodiment.

In some examples, the sensor data sent to a control center may additionally include a video stream of one or more portions of the environment of an autonomous vehicle. FIG. 4C shows a video stream of the environment 400 of autonomous vehicle 402 from the point-of-view of the autonomous vehicle 402. For example, the autonomous vehicle 402 may be equipped with one or more video cameras which capture video streams of a portion of the environment 400. In this example, the portion of the environment 400 captured in the video stream includes the temporary stop sign 404 as well as a "Lane Closed" sign 406 (that the autonomously vehicle 402 may or may not have properly identified), and a portion of a construction vehicle 408 beyond the signs within the lane of travel.

Block 306 of method 300 includes validating some of the information reports received from autonomous vehicles within the fleet using the received sensor data. An information report may need to be validated before sending it out to other vehicles in order to avoid sending erroneous or misleading reports to the fleet. Within examples, an information report may be validated by comparing the report to sensor data collected by the vehicle sending the report and/or by other vehicles in the same area in order to confirm the accuracy of the report.

In some example systems, a confidence metric may be associated with information reports indicating how confident the system is in the information contained within the report. A combination of different factors may be used to determine a confidence level in a particular report. For example, some types of reports may be more likely to be erroneous (e.g., some types of road conditions may be more difficult for vehicles to detect and identify than others). Also, some vehicles may have been more accurate with previous information reporting than other vehicles. In such instances, higher confidence may be attached to vehicles with a history of accurate reporting.

In further examples, the level of validation required for a particular information report may be determined based on the confidence metric associated with the report. For instance, certain reports with a high confidence metric (e.g., above a predefined threshold level) may be automatically validated without further processing. In other examples, certain reports may be validated after a certain number of similar reports are received within a certain time window (confirming that the reports are likely to be accurate). In further examples, the level of confidence required to validate a particular report may be determined in part based on the importance of information contained within the report. For instance, a report relating to a high traffic or highly populated area may require greater confidence to be validated. Also, reports relating to more important road conditions (e.g., a total blockage requiring vehicle re-routing) also may require higher confidence for validation.

In additional examples, additional validation procedures may be used to validate some of the information reports. In some cases, these procedures may be executed by a remote computing system, which may have more computing power and/or stored information about the environment than computing systems located on the autonomous vehicles. Therefore, the remote computing system may be programmed to process sensor data and confirm the accuracy of information reports.

In further examples, a human operator may be used to validate some of the information reports instead of or in addition to a remote computing system. In some examples, the human operator may be located in a remote location that has a wireless connection with a communication system of autonomous vehicles within the fleet. For example, a remote human operator may be located at a remote computer terminal with a user interface that provides information from an autonomous vehicle in order for the human operator to validate an information report from the vehicle.

Figure 4D:
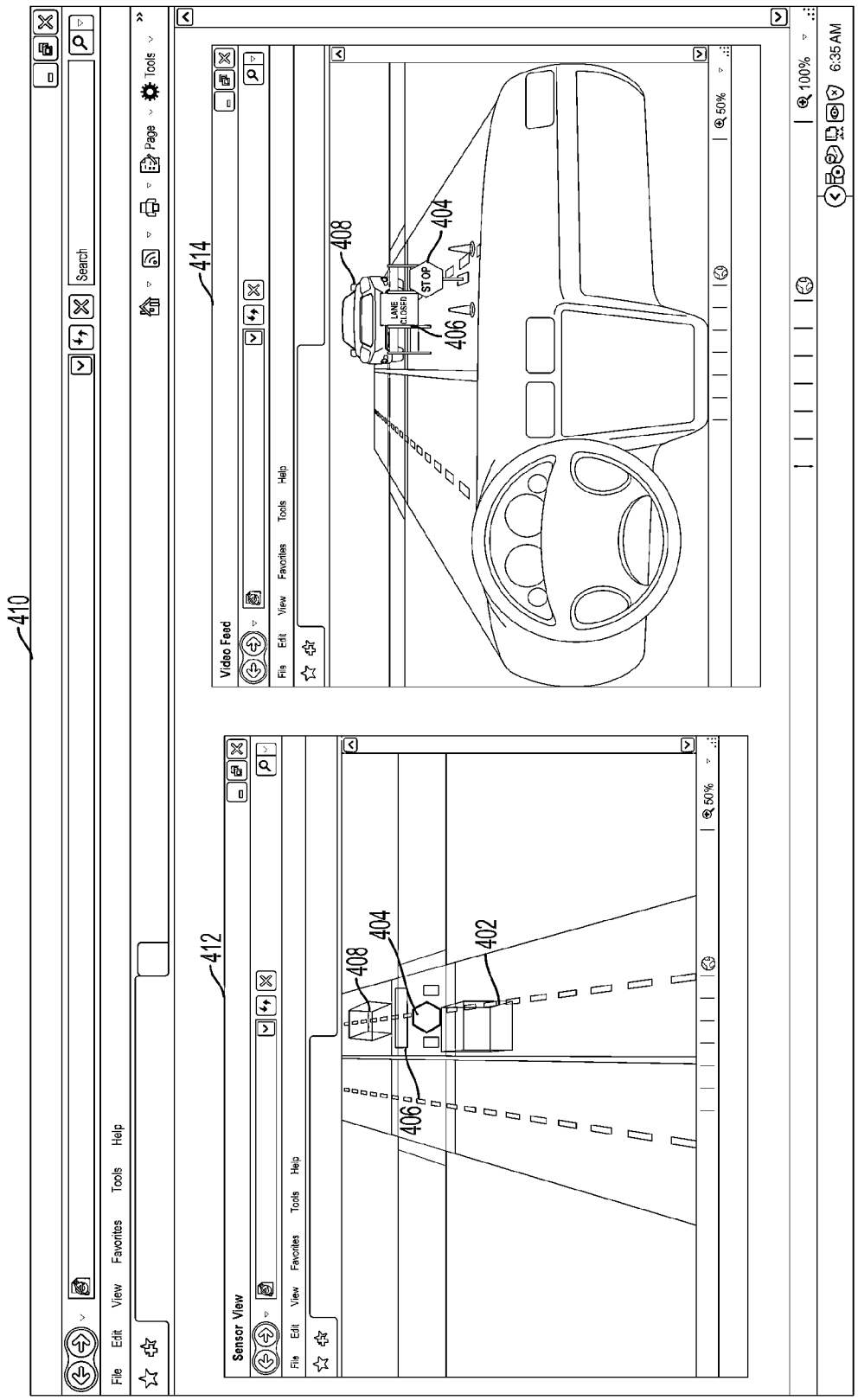
FIG. 4D illustrates a user interface containing the sensor representation from FIG. 4B and the video feed from FIG. 4C, according to an example embodiment.

For instance, FIG. 4D shows one example user interface that may be presented to a human operator. The user interface 410 may include separate sub-windows 412 and 414. The first sub-window 412 may include the vehicle's representation of its environment, such as described above with respect to FIG. 4B. The second sub-window 414 may include a video stream of a portion of the environment, such as described above with respect to FIG. 4C. Accordingly, the human operator may be able to compare the vehicle's understanding of its environment with the video stream to verify the vehicle's representation of its environment and/or to verify an information report about a driving condition within the environment sent by the vehicle. In some examples, the vehicle's representation of its environment may also be overlayed on top of the video stream within the user interface. For instance, rather than showing the vehicle's representation in sub-window 412 and the video stream in sub-window 414 as separate windows within a user interface as shown in FIG. 4C, a user interface may contain a single viewing window with both the video stream and the vehicle's representation aligned. Overlaying the vehicle's representation may make it easier for an operator to understand how detected objects in the vehicle's representation may correspond to visual objects within the video stream.

Figure 4E:
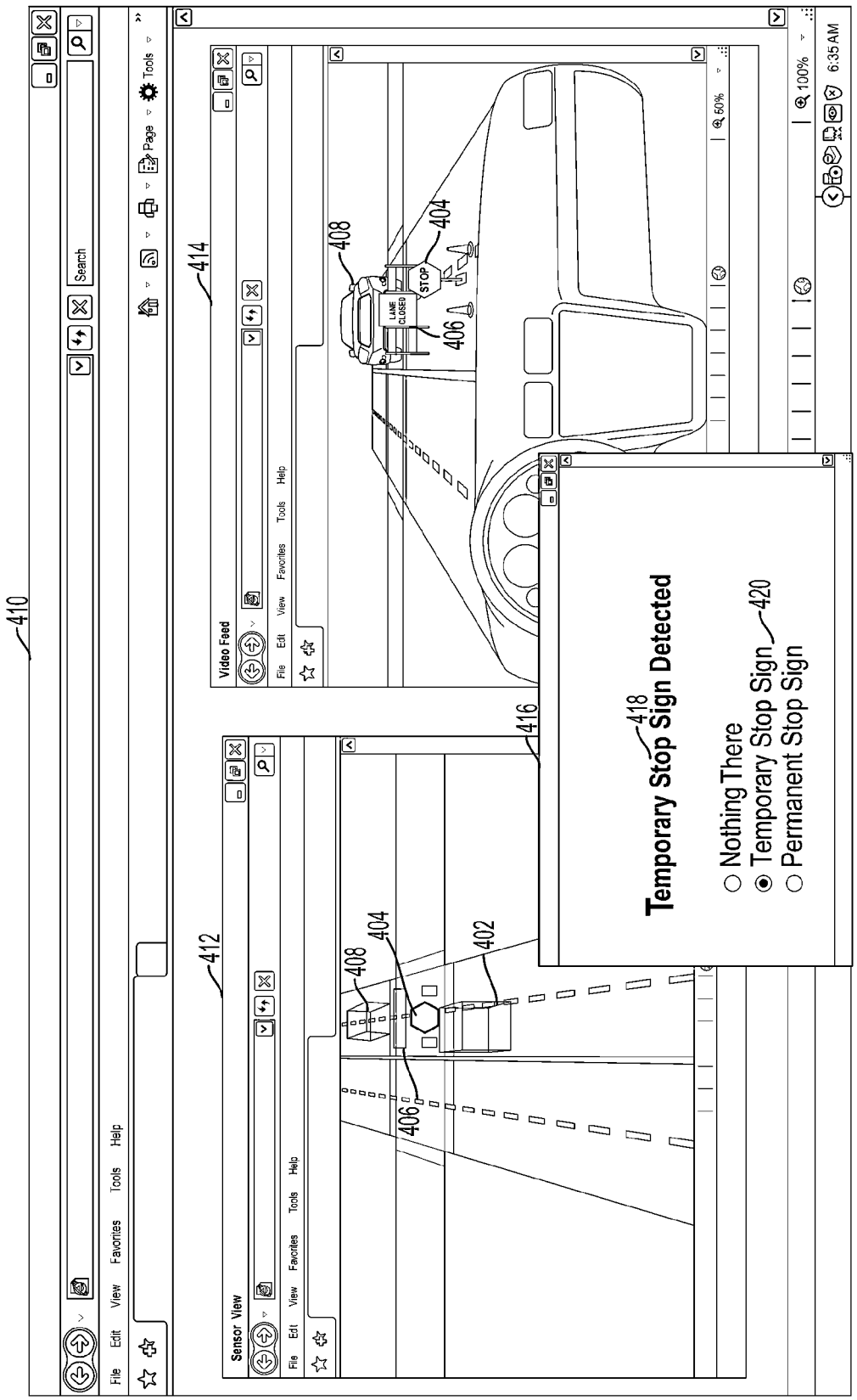
FIG. 4E illustrates the user interface from FIG. 4D including a control menu, according to an example embodiment.

For example, FIG. 4E shows an example user interface that contains a first sub-window showing the vehicle's representation of its environment and a second sub-window showing a video of a portion of the vehicle's environment, such as described above with respect to FIG. 4D. FIG. 4E additionally contains a control menu 416 that allows a human operator to verify the report of a Temporary Stop Sign Detected 418. In this example, the human guide has selected Temporary Stop Sign 420 from the menu 416 in order to confirm the information report from autonomous vehicle 402 of a temporary stop sign 404 within environment 400. The human guide may also be able to modify or enhance the information report (e.g., to indicate that the lane is closed due to construction). In other examples, the human guide may indicate that there is nothing there or that the vehicle actually identified a permanent stop sign, and the information map may be updated accordingly.

In some examples, the human operator may only be asked for assistance for information reports with an associated confidence metric below a predetermined level. In additional examples, the human operator may only be asked for assistance for information reports of particular importance (e.g., reports that affect a certain number of vehicles within the fleet and/or require significant re-routing or other expensive operations within the fleet). Other factors may be used to determine when to use a remote operator to assist in validation as well or instead.

In additional examples, a control center may validate some information reports by deploying vehicles (e.g., an autonomous vehicle or a manually controlled vehicle) within the fleet to the area to investigate the report and/or collect sensor data from the area. In some examples, vehicles nearby a particular report that can easily be re-routed to investigate the report may be sent. In other examples, vehicles that currently do not have an assigned route within the fleet may be sent to investigate certain information reports (e.g., to determine whether a previously reported blockage has been cleared). In additional examples, only certain reports (e.g., those with low confidence and/or those containing information of particular importance) may require sending vehicles within the fleet to investigate.

Block 308 of method 300 includes combining validated information reports into a driving information map. Within examples, the driving information map may contain reported issues relating to driving conditions at particular locations within the environment. Additionally, the driving information map may contain other information associated with the reports, possibly including times when reports were made, rationales behind why the reports were made, and/or any of the types of sensor data described above corresponding to particular reports.

The information reports may be combined into a format that allows the reports to easily be transmitted out to vehicles in the fleet. In some examples, duplicate reports (e.g., describing the same obstacle or incident) may be removed from the map or compacted into a more condensed format. In other examples, information reports may be combined in more complex ways. For instance, new information reports may be used to refine or enhance information contained in previously stored reports. In other examples, a statistical method (e.g., Bayesian inference) or different type of algorithm may be used to combine observations from cars as they are received in order to refine current models of obstacles or obstructions within the environment. In further examples, incremental versions of the database at different points in time may also be created and stored. Other methods of combining individual information reports into the map may be used as well or instead.

Block 310 of method 300 includes periodically filtering the driving information map to remove outdated information reports. Within examples, information reports may only be relevant for decision making by autonomous vehicles within the fleet for a certain period of time. For instance, a reported lane blockage resulting from an accident may only be important for a short period of time until the blockage is cleared by emergency crews. At that point, some or all of the information in the particular information report may be removed from the map.

In some examples, certain information reports may be assigned a particular timeout value after which the report may be removed from the driving information map. For instance, a parade may be identified which is blocking certain roads currently, but may be scheduled to end within a certain amount of time. Accordingly, the information report can be removed from the map after the appropriate amount of time has passed (possibly with some buffer built on and/or after some external validation has been received, such as from a human in the area or another autonomous vehicle). Other types of reports that may be assigned timeout periods may include road blockages from concerts or sporting events, construction areas, or weather conditions (perhaps with less confidence or requiring further validation). Other types of reports may need to be stored for an indefinite time period. For instance, it may not be possible to predict when a blockage resulting from an accident will be completely cleared. Such reports may only be removed when an autonomous vehicle within the fleet or a different reporter confirms that the obstruction has been cleared.

Block 312 of method 300 includes providing portions of the driving information map to autonomous vehicles within the fleet. Autonomous vehicles may use information reports to identify potential obstacles and route around them or determine other ways to avoid or handle them. In some examples, only certain portions of the map may be transmitted to individual vehicles due to bandwidth restrictions and/or for efficiency gains by avoiding overburdening vehicles with irrelevant data that may require additional computing power. For instance, a vehicle may receive reports within a certain radius of its current location or within a certain radius of its planned route or routes.

Figure 5:
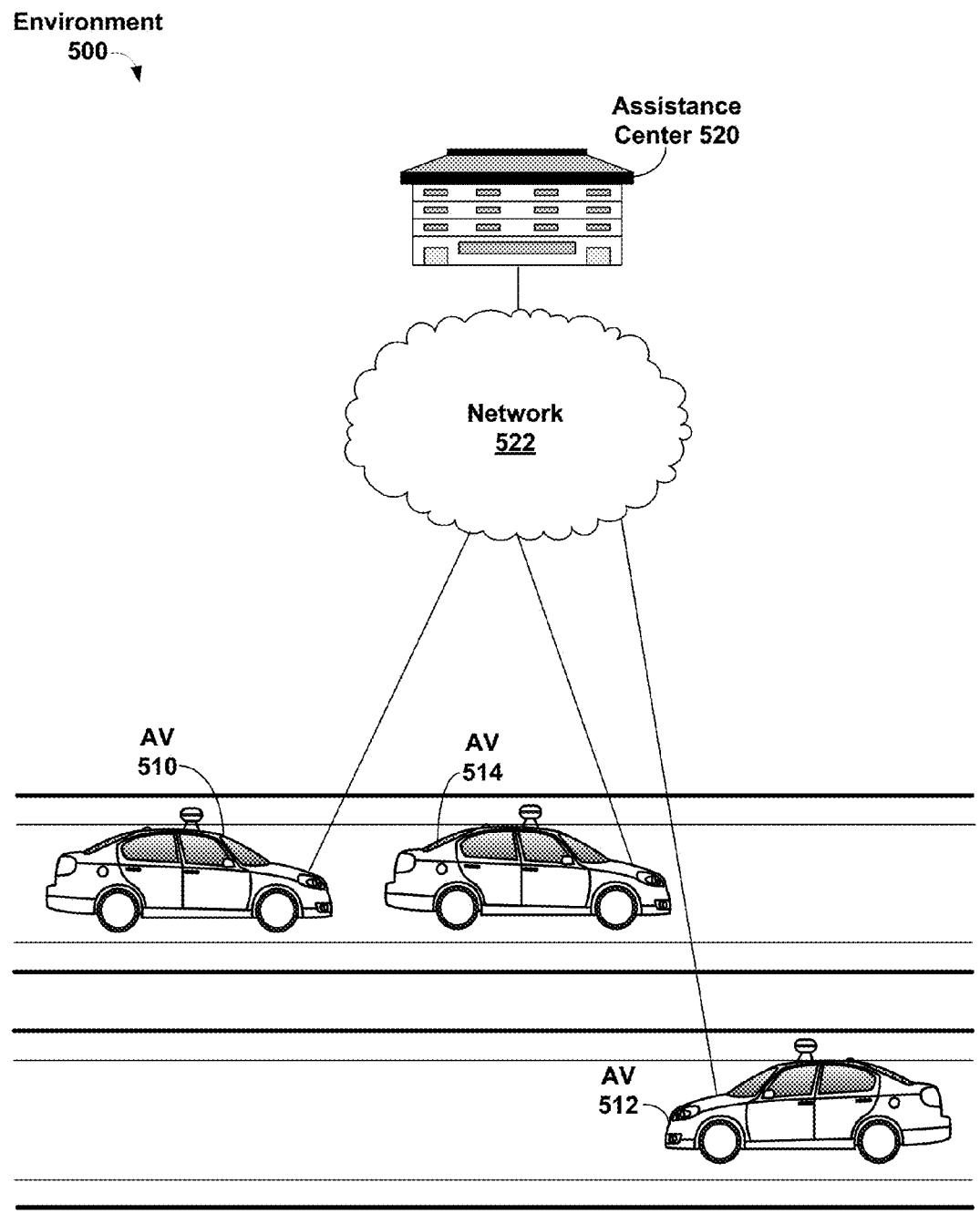
FIG. 5 illustrates an environment containing vehicles from a fleet of autonomous vehicles and an assistance center, according to an example embodiment.

FIG. 5 shows an example of vehicles from a fleet of autonomous vehicles along with an assistance center, according to an example embodiment. An assistance center 520 may receive information reports (and/or other information such as sensor data) from autonomous vehicles 510, 512, and 514 operating within an environment 500 via a network 522, such as a wireless communication network. Additionally, the assistance center 520 may process incoming information reports and sensor data in order to validate and combine the reports into an information map. In some examples, the assistance center 520 may utilize computing systems and/or human operators to assist in validating and/or combining reports. The assistance center 520 may also provide portions of the map out to autonomous vehicles 510, 512, or 514 via the network 522. In other examples, operations may be divided among different locations or centers. For instance, multiple assistance centers may receive, validate, combine, and/or transmit information reports. Information reports and/or sensor data may also be sent between autonomous vehicles in some examples. Other configurations are also possible.

In some examples, in addition to transmitting information about possible driving conditions within the environment, the assistance center may additionally transmit proposed solutions to the conditions (e.g., an obstacle and how to get around it). In some examples, proposed solutions may have been determined to work by other autonomous vehicles within the fleet. In other examples, the proposed solution may have been suggested or validated by a remote human operator (or a more powerful computing system than exists on the autonomous vehicles).

For instance, a remote human operator (located at an assistance center or elsewhere) may assistance a vehicle in determining how to proceed when facing a particular obstacle within the environment. Referring back to FIG. 4E, the operator may additionally be able to send a response to the autonomous vehicle indicating how the vehicle should proceed in the given scenario. For instance, the operator may confirm the existence of the temporary stop sign 404 and also determine that the lane is closed due to construction based on sensor data (e.g., a video feed) of the "Lane Closed" sign 406 and the construction vehicle 408. Accordingly, the operator may send a proposed mode of operation for the autonomous vehicle to get past the obstacle.

Figure 4F:
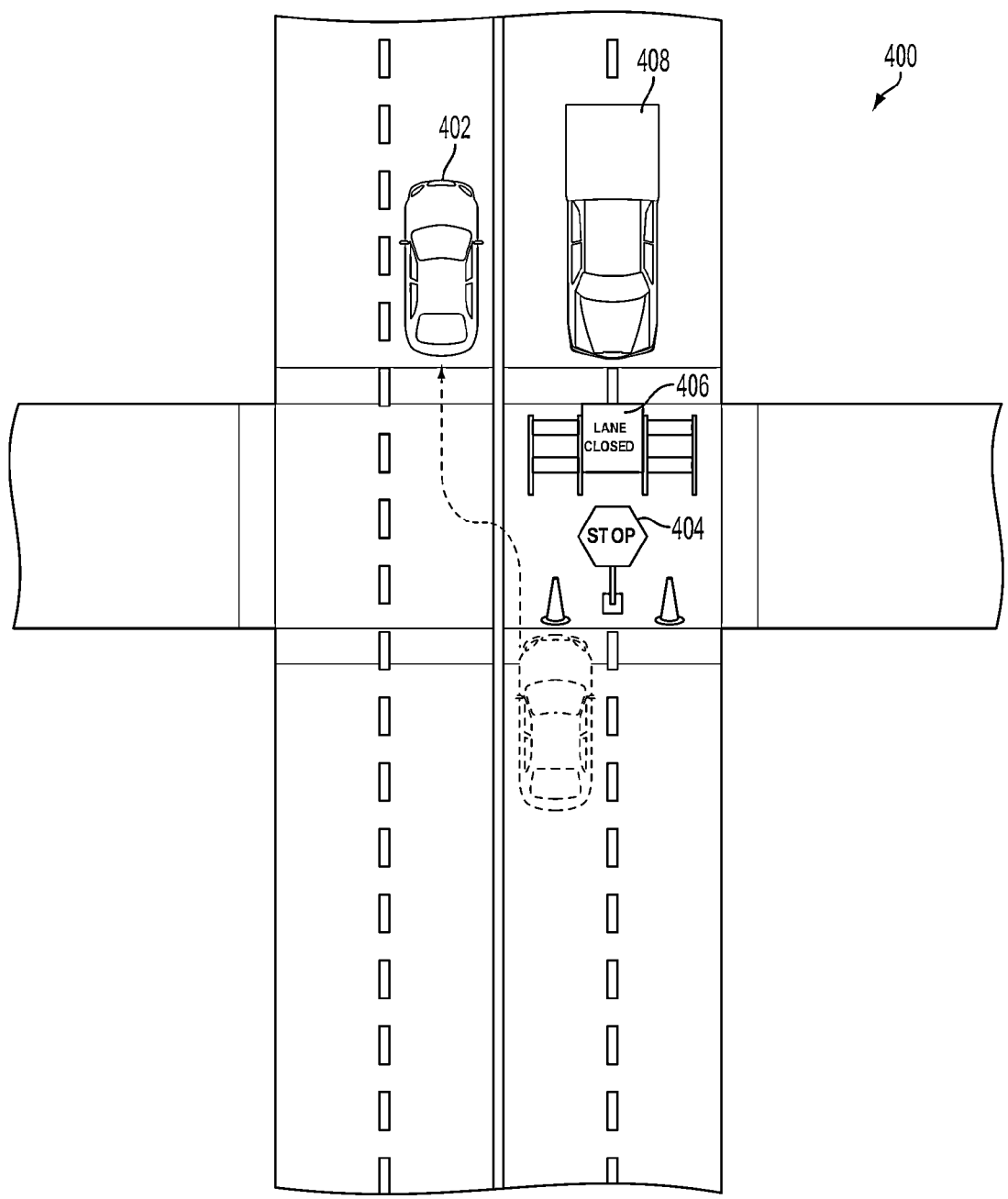
FIG. 4F illustrates a top view of the autonomous vehicle from FIG. 4A after completing an autonomous operation, according to an example embodiment.

FIG. 4F shows the autonomous vehicle 402 passing the blocked lane on the left. For example, a remote operator may have viewed a video stream of the environment and verified that the autonomous vehicle 402 could safely move to the left lane to pass the construction (e.g., by verifying that there is no oncoming traffic). Upon successfully traversing the obstacle, the steps used by the autonomous vehicle 402 and confirmed by the human operator may be added to the driving information map. Accordingly, this information may be transmitted out to other vehicles within the area that may approach the same obstacle in order to assist the vehicles in not only identifying the closed lane, but also figuring out how to get through. In this example, the solution may require other vehicles to also request assistance in order to pass the obstacle (e.g., to verify that the oncoming lane is clear). In another example, there may be an additional lane going in the same direction so that the solution may simply require future vehicles to change to the left lane in advance of the obstacle. Proposed modes of operation to circumvent or deal with particular road events may be determined or verified in other ways as well (e.g., by a remote computing system) before providing the proposed modes to other vehicles within the fleet.

Figure 6:
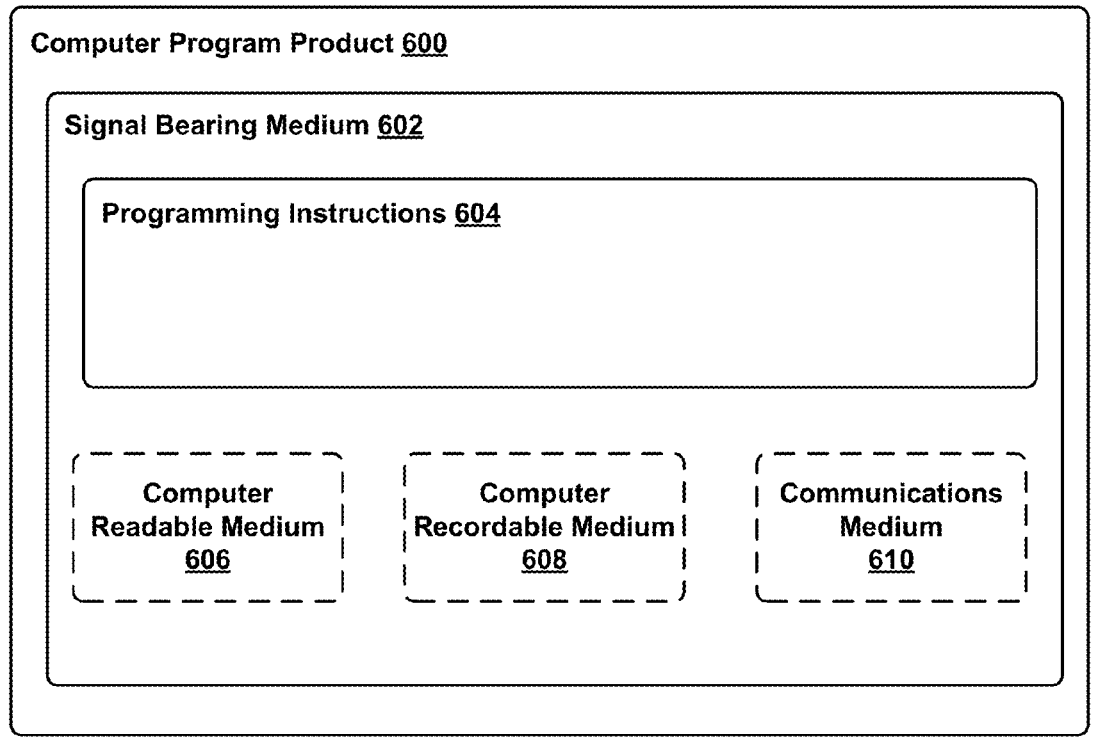
FIG. 6 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A computer-implemented method comprising:
   receiving information reports relating to driving conditions from a plurality of autonomous vehicles within a fleet of autonomous vehicles;
   receiving sensor data from the plurality of autonomous vehicles within the fleet of autonomous vehicles;
   validating some of the information reports based on the sensor data;
   determining confidence metrics associated with information reports, wherein a confidence metric associated with an information report indicates a level of confidence in information contained within the information report;
   validating information reports with associated confidence metrics above a threshold level;
   combining validated information reports into a driving information map;
   periodically filtering the driving information map to remove outdated information reports; and
   providing portions of the driving information map to autonomous vehicles within the fleet of autonomous vehicles.

2. The method of claim 1, wherein the threshold level is varied for individual information reports based on a level of importance of information contained within the individual information reports.

3. The method of claim 1, further comprising:
   requesting validation of some of the information reports from a human assistor before combining the information reports into the driving information map.

4. The method of claim 3, further comprising:
   providing for display of one or more captured images within a user interface presented to the human assistor to use in validating the information reports.

5. The method of claim 1, wherein information reports are validated after receiving a certain number of information reports relating to a particular driving condition within a certain time window.

6. The method of claim 1, wherein combining the information reports comprises removing duplicate information reports.

7. The method of claim 1, further comprising:
   determining proposed solutions to certain driving conditions associated with one or more of the information reports; and
   providing the proposed solutions to autonomous vehicles within the fleet of autonomous vehicles.

8. The method of claim 1, further comprising:
   sending one or more vehicles to an area in order to validate an information report.

9. A system comprising:
   a processor;
   a control system configured to:
   receive information reports relating to driving conditions from a plurality of autonomous vehicles within a fleet of autonomous vehicles;
   receive sensor data from the plurality of autonomous vehicles within the fleet of autonomous vehicles;
   validate some of the information reports based on the sensor data;
   determine confidence metrics associated with information reports, wherein a confidence metric associated with an information report indicates a level of confidence in information contained within the information report;

validate information reports with associated confidence metrics above a threshold level;

combine validated information reports into a driving information map; periodically filter the driving information map to remove outdated information reports; and provide portions of the driving information map to autonomous vehicles within the fleet of autonomous vehicles.

10. The system of claim 9, wherein the control system is further configured to:

request validation of some of the information reports from a human assistor before combining the information reports into the driving information map.

11. The system of claim 9, wherein the control system is configured to validate an information report after receiving a certain number of information reports relating to a particular driving condition within a certain time window.

12. A non-transitory computer readable medium having stored therein instructions, that when executed by a computing system, cause the computing system to perform functions comprising:

receiving information reports relating to driving conditions from a plurality of autonomous vehicles within a fleet of autonomous vehicles;

receiving sensor data from the plurality of autonomous vehicles within the fleet of autonomous vehicles;

validating some of the information reports based on the sensor data;

determining confidence metrics associated with information reports, wherein a confidence metric associated with an information report indicates a level of confidence in information contained within the information report;

validating information reports with associated confidence metrics above a threshold level;

combining validated information reports into a driving information map;

periodically filtering the driving information map to remove outdated information reports; and providing portions of the driving information map to autonomous vehicles within the fleet of autonomous vehicles.

13. The non-transitory computer readable medium of claim 12, further comprising instructions, that when executed by a computing system, cause the computing system to perform a function comprising:

requesting validation of some of the information reports from a human assistor before combining the information reports into the driving information map.

14. The non-transitory computer readable medium of claim 12, further comprising instructions, that when executed by a computing system, cause the computing system to perform a function comprising:

sending one or more of the autonomous vehicles from the fleet of autonomous vehicles to an area in order to validate an information report.

* * * * *